(12) United States Patent
Sato (10) Patent No.: US 10,688,953 B2
(45) Date of Patent: Jun. 23, 2020

(54) REAR SEAT SIDE AIRBAG DEVICE

(71) Applicant: TOYOTA JIDOSHA KABUSHIKI KAISHA, Toyota-shi, Aichi-ken (JP)

(72) Inventor: Masanori Sato, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 16/165,126

(22) Filed: Oct. 19, 2018

(65) Prior Publication Data

US 2019/0168703 A1  Jun. 6, 2019

(30) Foreign Application Priority Data

Dec. 1, 2017 (JP) ................................. 2017-231821

(51) Int. Cl.
  *B60R 21/21* (2011.01)
  *B60R 21/231* (2011.01)
  *B60R 21/2338* (2011.01)

(52) U.S. Cl.
  CPC .......... *B60R 21/21* (2013.01); *B60R 21/2338* (2013.01); *B60R 21/23138* (2013.01); *B60R 2021/23153* (2013.01); *B60R 2021/23388* (2013.01)

(58) Field of Classification Search
  CPC ................ B60R 21/21; B60R 21/2338; B60R 21/23138; B60R 2021/23388; B60R 2021/23153
  See application file for complete search history.

(56) References Cited

U.S. PATENT DOCUMENTS

| 5,636,862 | A | * | 6/1997 | Cheung ................. B60R 21/207 280/730.2 |
| 2006/0061073 | A1 | | 3/2006 | Naruse et al. |
| 2006/0119083 | A1 | * | 6/2006 | Peng ..................... B60R 21/207 280/730.2 |
| 2013/0200599 | A1 | | 8/2013 | Shamoto et al. |
| 2015/0367804 | A1 | * | 12/2015 | Fujiwara ........... B60R 21/23138 280/730.2 |
| 2017/0036635 | A1 | * | 2/2017 | Tanabe ................. B60R 21/207 |
| 2017/0072900 | A1 | | 3/2017 | Fujiwara |
| 2017/0174169 | A1 | * | 6/2017 | Tanabe .............. B60R 21/23138 |
| 2018/0086299 | A1 | * | 3/2018 | Kalinowski ............ B60R 21/21 |
| 2018/0290619 | A1 | * | 10/2018 | Kitagawa .......... B60R 21/23138 |
| 2019/0031133 | A1 | * | 1/2019 | Dry .................. B60R 21/23138 |

(Continued)

FOREIGN PATENT DOCUMENTS

| JP | 10324212 | A | * | 12/1998 | ........... B60R 21/233 |
| JP | 2006-088850 | A | | 4/2006 | |

(Continued)

*Primary Examiner* — Drew J Brown
(74) *Attorney, Agent, or Firm* — Oliff PLC (57) ABSTRACT

A rear seat side airbag device includes: a case provided inside a vehicle cabin side portion in correspondence with a rear seat, the case being open substantially toward a vehicle front side; an inflator accommodated inside the case, the inflator configured to generate gas at a time of vehicle collision; and a side airbag accommodated inside the case and is configured to receive a supply of gas from the inflator and inflates and expands, the side air bag including a distal end portion being fixed to a region of the case or a vehicle body, which region is at a vehicle width direction inner side with respect to the inflator.

4 Claims, 7 Drawing Sheets

(56) References Cited

U.S. PATENT DOCUMENTS

2019/0047507 A1* 2/2019 Zischka .............. B60R 21/2338
2019/0135218 A1* 5/2019 Takahashi ............. B60R 21/207

FOREIGN PATENT DOCUMENTS

| JP | 2016-020148 A | 2/2016 |
| JP | 2017-052494 A | 3/2017 |
| WO | 2012/053082 A1 | 4/2012 |

* cited by examiner

REAR SEAT SIDE AIRBAG DEVICE

CROSS-REFERENCE TO RELATED APPLICATION

This application claims priority under 35 USC 119 from Japanese Patent Application No. 2017-231821, filed on Dec. 1, 2017, the disclosure of which is incorporated by reference herein.

BACKGROUND

Technical Field

The present invention relates to a rear seat side airbag device.

Related Art

Japanese Patent Application Laid-Open (JP-A) No. 2006-088850 discloses a side airbag device. This side airbag device is accommodated inside a case provided in a seat side garnish (below referred to as "the side garnish") that is provided between a seat back of the rear seat and a vehicle side portion. An airbag door circumscribed by a tear portion and a hinge portion is formed in a cabin inner side end portion of the side garnish. At a time of vehicle collision, the inflating airbag ruptures the tear portion from inside the case and opens the airbag door. Hence, the airbag inflates and expands toward a vehicle front side between a vehicle occupant sitting on the rear seat and the vehicle side portion.

However, in the structure disclosed in JP-A No. 2006-088850, the side airbag device is disposed relatively close to the vehicle occupant in the vehicle front-and-rear direction. Consequently, when the airbag inflates and expands, a region, at which a vehicle width direction dimension (below referred to as "the thickness") of the airbag is largest, is disposed at the vehicle front side relative to the vehicle occupant. As a result, restraint performance for the vehicle occupant may be diminished. In order to counteract this, disposing a design surface of the rear seat to the vehicle front side with respect to the side garnish and moving the vehicle occupant toward the vehicle front side may be considered. However, because this produces an appearance in which design surfaces of the side garnish and the rear seat are not continuous, visual design may be diminished. Disposing the side airbag device to the vehicle rear side relative to the side garnish may also be considered. However, in a small car or the like, a wheel house is disposed in a vicinity of the side garnish. Therefore, it may not be possible to dispose the side airbag device further to the vehicle rear side. Adding a tether to the airbag to form a flattened inflated shape and disposing the region of the airbag at which the thickness is greatest to the side of the vehicle occupant may also be considered. However, the structure of the airbag may become more complicated in this case.

SUMMARY

The present disclosure provides a rear seat side airbag device that may improve restraint performance for a vehicle occupant.

A first aspect of the present disclosure is a rear seat side airbag device including: a case provided inside a vehicle cabin side portion in correspondence with a rear seat, the case being open substantially toward a vehicle front side; an inflator accommodated inside the case, the inflator configured to generate gas at a time of vehicle collision; and a side airbag accommodated inside the case and is configured to receive a supply of gas from the inflator and inflates and expands, the side air bag including a distal end portion being fixed to a region of the case or a vehicle body, which region is at a vehicle width direction inner side with respect to the inflator.

According to the first aspect of the present disclosure, the inflator and the side airbag are accommodated in the case that is provided in the vehicle cabin side portion in correspondence with the rear seat and that opens substantially toward the vehicle front side. The inflator generates gas at the time of a vehicle collision. The distal end portion of the side airbag is fixed to the region of the case or vehicle body that is at the vehicle width direction inner side with respect to the inflator. Therefore, when the side airbag receives the supply of gas from the inflator at the time of vehicle collision, the side airbag inflates substantially toward the vehicle front side through the opening of the case. However, because the distal end portion of the side airbag is fixed to the case or vehicle body in the region at the vehicle width direction inner side with respect to the inflator, the side airbag inflates and expands in a folded-back state in a vehicle plan view. Therefore, the thickness of the side airbag may be increased in a vicinity of the opening of the case, as a result of which the side airbag whose thickness is increased due to being folded back may be disposed in a vicinity of the vehicle occupant sitting on the rear seat. Hence, the vehicle occupant may be restrained effectively during the vehicle collision.

The term "distal end portion" as used herein is intended to include an end portion at an opposite side of the side airbag from an end portion thereof that is in a vicinity of the inflator in the vehicle front-and-rear direction. The term "vehicle cabin side portion" as used herein is intended to include an interior decor member such as a pillar garnish, a door trim, a side garnish or the like that is disposed at a vehicle width direction outer side of a vehicle cabin.

In a second aspect of the present disclosure, in the first aspect, a long hole may be formed in the case or vehicle body, a length direction of the long hole being in a substantial vehicle vertical direction, and the distal end portion may be fixed to the vehicle body or case by a fastener that is inserted into the long hole, the fastener is movable along the long hole when an expansion pressure of the side airbag is applied.

According to the second aspect of the present disclosure, the long hole whose length direction is in the substantial vehicle vertical direction is formed in the case or vehicle body. The distal end portion is fixed to the vehicle body or case by the fastener that is inserted into the long hole whose length direction is in the substantial vehicle vertical direction and that is movable along the long hole. Thus, the distal end portion is movable in the substantial vehicle vertical direction. Accordingly, at a time of non-activation of the side airbag, the distal end portion is disposed in a vicinity of the case in the substantial vehicle vertical direction. Therefore, the side airbag may be folded compactly. In contrast, at a time of activation of the side airbag, the distal end portion is moved in the substantial vehicle vertical direction by the expansion pressure of the side airbag. Therefore, a range in which the vehicle side airbag inflates and expands may be widened in the substantial vehicle vertical direction.

In a third aspect of the present disclosure, in the first aspect or the second aspect, the distal end portion may be fixed to a bracket, the bracket attached to the vehicle body or case.

According to the third aspect of the present disclosure, because the distal end portion is fixed to the bracket that is attached to the vehicle body or case, application of the present disclosure to another type of vehicle in which the vehicle body is different is enabled by modifying the shape of the bracket. In other words, commoditization of the rear seat side airbag device is simple.

In a fourth aspect of the present disclosure, in any one of the first to third aspects, the distal end portion may include a strap that is a separate body, the strap including one end portion fixed to the side airbag and another end portion fixed to the vehicle body or case.

According to the fourth aspect of the present disclosure, the distal end portion is formed as the separate strap of which the one end portion is fixed to the side airbag and the another end portion is fixed to the vehicle body or case. Therefore, there is no need to provide a region at the side airbag for fixing the side airbag to the case or vehicle body. Consequently, the shape of the side airbag may be formed simple and may be formed in a shape that is better for productivity.

The rear seat side airbag device according to the first aspect of the present disclosure may improve restraint performance for a vehicle occupant.

The rear seat side airbag device according to the second aspect of the present disclosure may further improve the restraint performance for a vehicle occupant.

The rear seat side airbag devices according to the third and fourth aspects of the present disclosure may reduce costs.

BRIEF DESCRIPTION OF THE DRAWINGS

Exemplary embodiments will be described in detail based on the following figures, wherein.

DETAILED DESCRIPTION

Below, a present exemplary embodiment for embodying the present disclosure is described in detail with reference to the drawings. The arrow FR shown in the drawings indicates a vehicle front-and-rear direction front side, the arrow OUT indicates a vehicle width direction outer side, and an arrow UP indicates a vehicle vertical direction upper side.

Figure 1:
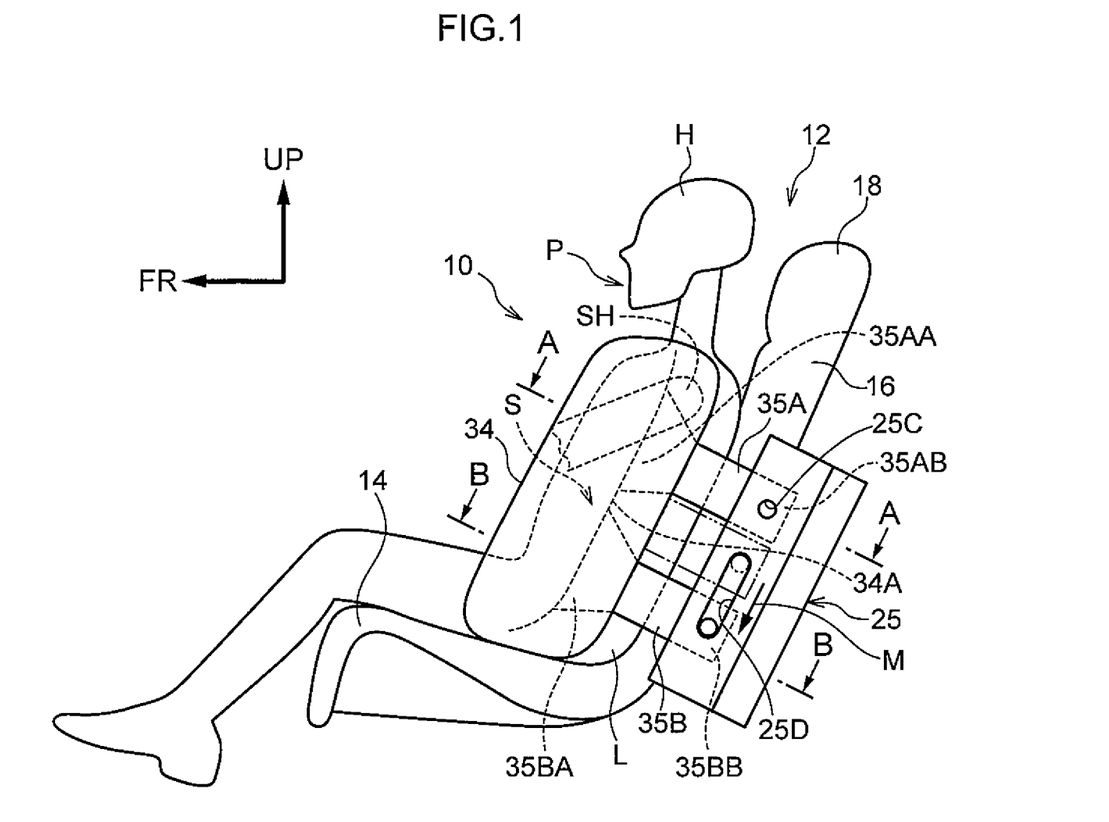
FIG. 1 is a vehicle side view showing a state subsequent to activation of a rear seat side airbag device according to the present exemplary embodiment.

FIG. 1 shows a side view in which a rear seat 12 at which a rear seat side airbag device 10 according to the present exemplary embodiment is employed is seen from a vehicle side face side. FIG. 1 illustrates a state in which a crash test dummy (a mannequin) that serves as a model of a vehicle occupant who is to be protected is seated on a seat cushion 14 of the rear seat 12. The dummy is, for example, a WorldSID (World Side Impact Dummy) AF05 dummy (representing the fifth percentile of American adult females). The dummy is seated in a standard sitting attitude designated for crash testing, and the rear seat 12 is disposed at a standard specified position corresponding to the sitting attitude. Below, in order to facilitate understanding of the descriptions, the dummy is referred to as "the vehicle occupant P".

The rear seat 12 includes the seat cushion 14 and a seat back 16. A headrest 18 for supporting the head area H of the vehicle occupant P is provided at an upper end portion of the seat back 16.

Figure 2:
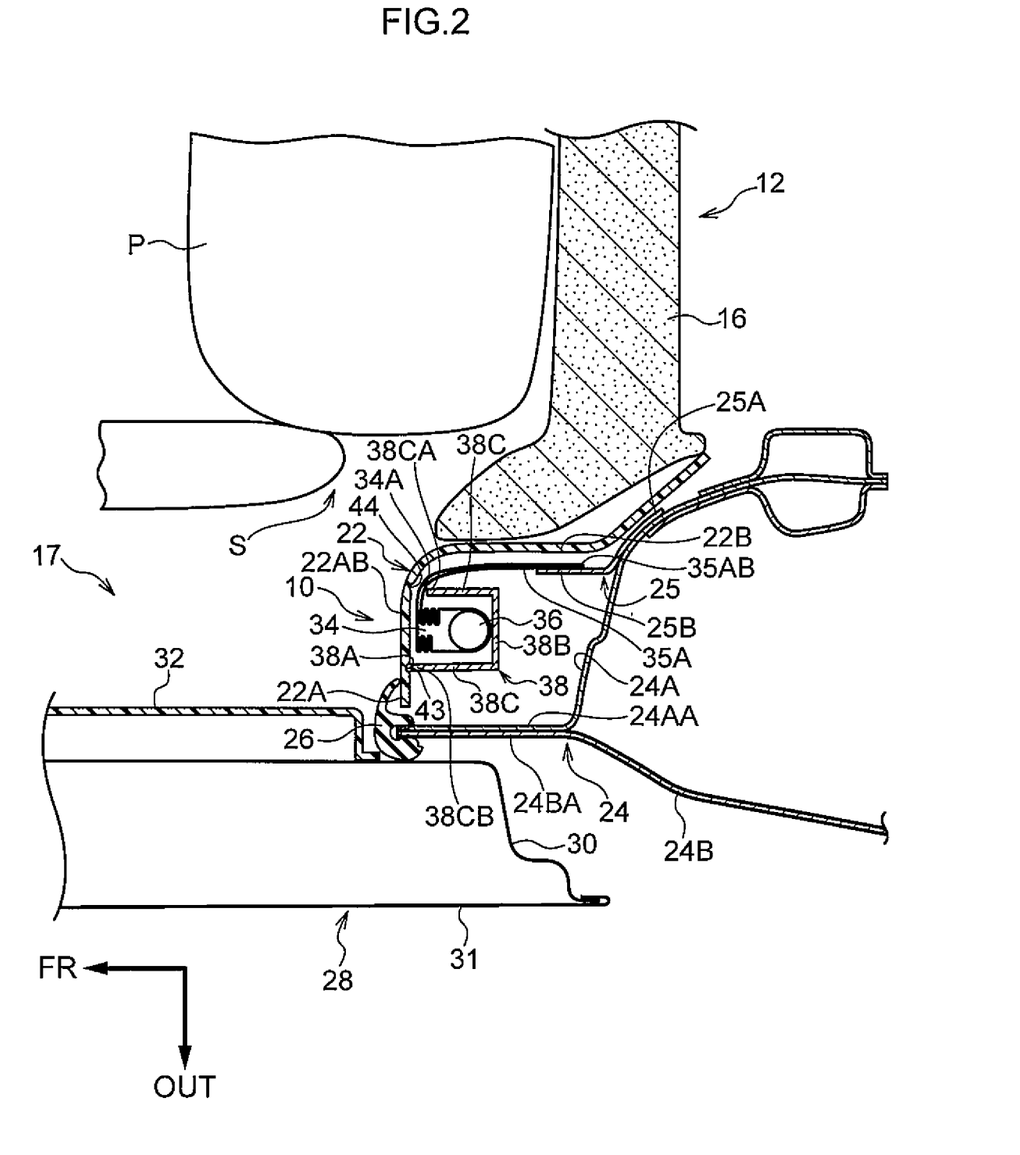
FIG. 2 is a magnified sectional diagram, cut along line A-A in FIG. 1, showing a state prior to activation of the rear seat side airbag device according to the present exemplary embodiment.

As shown in FIG. 2, a side garnish 22 is provided at the vehicle width direction outer side of the seat back 16 of the rear seat 12, that is, at a portion of a vehicle cabin side portion 17 that corresponds with the rear seat 12. The rear seat side airbag device 10 is assembled to the side garnish 22. In FIG. 1, although only the side garnish 22 and rear seat side airbag device 10 at the vehicle cabin side portion 17 at the vehicle left side are shown in the drawing, the side garnish 22 and rear seat side airbag device 10 are similarly provided at a vehicle cabin side portion at the vehicle right side. The rear seat side airbag device 10 at the vehicle right side and the rear seat side airbag device 10 at the vehicle left side have left-and-right symmetry. Accordingly, only the rear seat side airbag device 10 at the vehicle left side is described in the descriptions below.

The side garnish 22 is provided between a side of the seat back 16 and a wheel house 24 that serves as a vehicle body. The side garnish 22 is fabricated of resin. The side garnish 22 includes a cabin interior side wall portion 22A with a plate thickness direction substantially in the vehicle front-and-rear direction. The side garnish 22 further includes a rear seat side wall portion 22B that projects to the vehicle rear side from an end portion at the vehicle width direction inner side of the cabin interior side wall portion 22A. Thus, a house inner 24A, which is described below, of the wheel house 24 is covered from the vehicle width direction inner side thereof by the side garnish 22. The rear seat side airbag device 10 is assembled to the cabin interior side wall portion 22A of the side garnish 22. Details of the rear seat side airbag device 10 are described below.

The wheel house 24 includes the house inner 24A, which structures an inner panel, and a wheel house outer panel (below referred to as "the house outer") 24B, which structures an outer panel. An inner side flange 24AA is formed at a front end portion of the house inner 24A. An outer side flange 24BA is formed at a front end portion of the house outer 24B. A trim seal 26 is attached to a joining region of the inner side flange 24AA with the outer side flange 24BA.

A rear side door 28 is disposed at the vehicle front side relative to the wheel house 24. The rear side door 28 includes a door inner panel 30, which structures an inner panel, and a door outer panel 31, which structures an outer panel. A door trim 32 fabricated of resin, which is an interior decor member, is attached to the vehicle inner side of the door inner panel 30.

A bracket 25 is attached to the house inner 24A. The bracket 25 is formed in a substantially rectangular plate shape whose longer direction is substantially in the vehicle vertical direction in a vehicle plan view (see FIG. 1). The bracket 25 includes a house inner attachment wall portion 25A provided at the vehicle rear side and a projecting wall portion 25B provided at the vehicle front side relative to the house inner attachment wall portion 25A. The house inner attachment wall portion 25A is inflected so as to follow a vehicle width direction inner side face of the house inner 24A. The house inner attachment wall portion 25A is fastened to the house inner 24A by fasteners that are not shown in the drawings.

The projecting wall portion 25B projects toward the vehicle front side from an end portion at the vehicle front side of the house inner attachment wall portion 25A. The projecting wall portion 25B is disposed at the vehicle width direction inner side and vehicle rear side with respect to an inflator 36 of the rear seat side airbag device 10, which is described below. As shown in FIG. 1, a first fastening hole 25C and a second fastening hole 25D that serves as a long hole are formed in the projecting wall portion 25B. The first fastening hole 25C is provided at the vehicle upper side of the projecting wall portion 25B, and the second fastening hole 25D is provided at the vehicle lower side relative to the first fastening hole 25C.

The first fastening hole 25C is a penetrating hole that penetrates through the projecting wall portion 25B in the plate thickness direction thereof, and is formed in a circular shape in a vehicle side view. The second fastening hole 25D is a penetrating hole that penetrates in the plate thickness direction of the projecting wall portion 25B similarly to the first fastening hole 25C. The second fastening hole 25D is elongated with a length direction in a substantial vehicle vertical direction in the vehicle side view (to be specific, a direction along the seat back 16).

As shown in FIG. 2, the rear seat side airbag device 10 that is assembled to the side garnish 22 is disposed between the side garnish 22 and the wheel house 24. The rear seat side airbag device 10 includes a side airbag 34, the inflator 36 and a case 38. The case 38 is attached to the side garnish 22 and accommodates the side airbag 34 and inflator 36 thereinside. An opening portion 38A of the case 38, which is described below, is covered by the side garnish 22.

The inflator 36 that is employed is an ignition-type or cold gas-type inflator. When activated, the inflator 36 supplies generated gas into the side airbag 34. In the present exemplary embodiment, the inflator 36 is a cylinder-type inflator and is disposed with a length direction thereof substantially in the vehicle vertical direction. Plural gas jetting-out apertures (not shown in the drawings) are formed along a periphery face at a lower end portion of the inflator 36. When the inflator 36 is activated, gas is jetted out through the gas jetting-out apertures. The inflator 36 is formed as a cylinder-type inflator in the present exemplary embodiment but this is not limiting; the inflator 36 may be a disc-type inflator.

The inflator 36 is electronically connected with a control unit that is an electronic control unit (ECU) (not shown in the drawings). The inflator 36 is activated at a time of vehicle collision by the ECU.

The case 38 disposed between the side garnish 22 and the wheel house 24 is formed in a box shape of which the vehicle front side is open (the vehicle front side of the case 38 includes the opening portion 38A). An upper wall and a lower wall, which are not shown in the drawings, are provided at, respectively, an upper end portion and a lower end portion of the case 38. The upper wall is disposed at the vehicle upper side of the side airbag 34 and inflator 36 and structures an upper face of the case 38. The lower wall is disposed at the vehicle lower side of the side airbag 34 and inflator 36 and structures a lower face of the case 38.

A bottom wall 38B, which connects between rear ends of the upper wall and lower wall of the case 38, is provided at the case 38 at the vehicle rear side of the side airbag 34 and inflator 36. The bottom wall 38B is formed so as to support the side airbag 34 in an expanded state thereof from the vehicle rear side (see FIG. 4 and FIG. 5). The inflator 36 is disposed at a substantially central portion in the vehicle width direction of the bottom wall 38B. The bottom wall 38B of the case 38 and the house inner 24A are attached to one another via a bracket (not shown in the drawings). Thus, the case 38 is fixed to the wheel house 24.

A pair of side walls 38C of the case 38 protrude to the vehicle front side from two vehicle width direction end portions of the bottom wall 38B. Thus, the pair of side walls 38C are disposed to be spaced apart and oppose one another in the vehicle width direction. An end portion 38CA at the vehicle front side of the side wall 38C that, of the pair of side walls 38C, is at the vehicle width direction inner side is disposed to the vehicle rear side relative to an end portion 38CB at the vehicle front side of the side wall 38C that is at the vehicle width direction outer side. In this way, a gap (not shown in the drawings) is formed between the side wall 38C at the vehicle width direction inner side and an airbag door portion 22AB, which is described below.

The airbag door portion 22AB formed at the cabin interior side wall portion 22A of the side garnish 22 is disposed at the vehicle front side of the case 38. That is, a portion of the cabin interior side wall portion 22A that corresponds with a region between the pair of side walls 38C of the case 38 serves as the airbag door portion 22AB. The side airbag 34 and the inflator 36 are covered from the vehicle cabin side thereof by the airbag door portion 22AB. A hinge portion 43 with reduced thickness is formed at an end portion at the vehicle width direction outer side of the airbag door portion 22AB. A tear portion 44 with reduced thickness is formed at an end portion at the vehicle width direction inner side of the airbag door portion 22AB. The tear portion 44 is formed with a thinner panel thickness than the hinge portion 43. The tear portion 44 and the hinge portion 43 are formed at positions corresponding with the opening portion 38A, specifically, along outer edges of the opening portion 38A. Although not shown in the drawings, the tear portion 44 is formed substantially in a "C" shape in a vehicle front view, and the hinge portion 43 is formed in a straight line shape substantially in the vehicle vertical direction in the vehicle front view. Hence, when the tear portion 44 is subjected to expansion pressure during inflation and expansion of the side airbag 34 and the tear portion 44 ruptures, the hinge portion 43 acts as a hinge and the airbag door portion 22AB opens toward the vehicle front side and the vehicle width direction outer side about the hinge portion 43 (see FIG. 3 to FIG. 5).

The side airbag 34 is formed in a substantially rectangular bag shape whose longer direction is substantially in the vehicle vertical direction in vehicle side view. At a time of vehicle collision, the side airbag 34 inflates and expands through the opening portion 38A of the case 38 toward a region S at the vehicle width direction outer side of the vehicle occupant P, and protects the vehicle occupant P. As shown in FIG. 1, an airbag distal end portion 34A of the side airbag 34 includes a pair of straps 35A and 35B that serve as a distal end portion substantially in the vehicle vertical direction. The straps 35A and 35B are structured by cloth members that are separate bodies from the side airbag 34, and are each formed in a substantially rectangular shape whose longer direction is substantially in the vehicle front-and-rear direction in vehicle side view. One end portions 35AA and 35BA of the length directions of the straps 35A and 35B are sewn to the side airbag 34. The side airbag 34 according to the present exemplary embodiment is accommodated inside the case 38 in a folded state, which is a state prior to inflation and expansion (see FIG. 2). In the state in which the side airbag 34 is folded, the airbag distal end portion 34A and the straps 35A and 35B are wrapped round from a space between the side walls 38C and the airbag door portion 22AB at the vehicle width direction inner side of the case 38 to the vehicle width direction inner side of the case 38.

Another end portion 35AB of the length direction of the strap 35A, which is at the vehicle upper side, is fastened to the first fastening hole 25C of the bracket 25 via a fastener that is not shown in the drawings. Another end portion 35BB of the length direction of the strap 35B, which is at the vehicle lower side, is fastened to the second fastening hole 25D of the bracket 25 via a fastener that is not shown in the drawings. The another end portion 35BB of the strap 35B is fixed by fastening at the vehicle upper side of the second fastening hole 25D in a state prior to inflation and expansion of the side airbag 34 (see the two-dot chain lines in FIG. 1). When the fastener at the second fastening hole 25D is subjected to expansion pressure from the side airbag 34, the fastener may move substantially toward the vehicle lower side along the length direction of the second fastening hole 25D (see arrow M in the drawings). A folding method of the side airbag 34 in the state in which the side airbag 34 is folded is not particularly limited but may be bellows folding, roll folding or the like. Further, the side airbag 34 may be accommodated without being folded.

In the state in which the side airbag 34 has inflated and expanded, a front side portion of the side airbag 34 restrains a front portion side of the vehicle occupant P from a shoulder area SH to a pelvis area L, and a rear side portion of the side airbag 34 restrains a rear portion side of the vehicle occupant P from the shoulder area SH to the pelvis area L.

Figure 6:
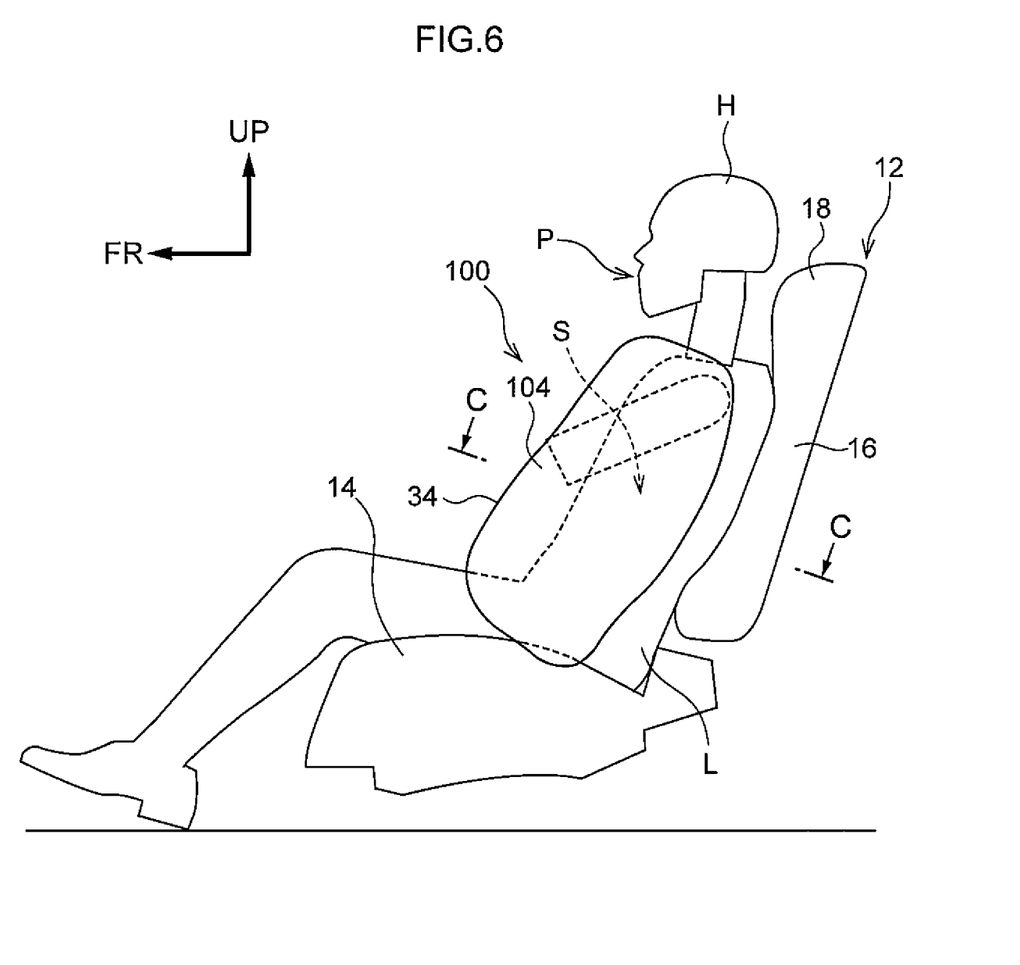
FIG. 6 is a vehicle side view showing a state subsequent to activation of a rear seat side airbag device according to a comparative example.
Figure 7:
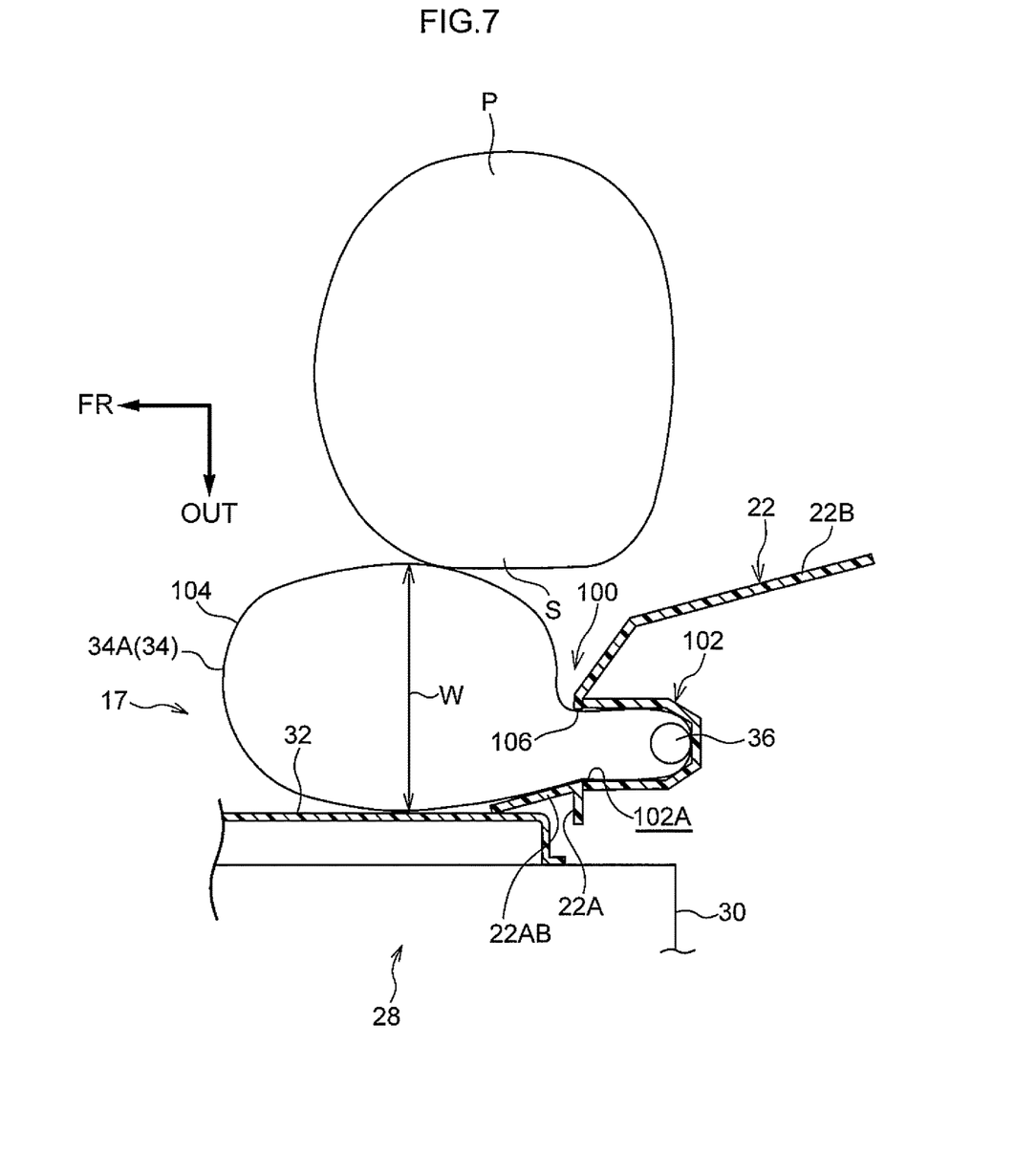
FIG. 7 is a magnified sectional diagram, cut along line C-C in FIG. 6, showing a state subsequent to activation of the rear seat side airbag device according to the comparative example.

The operation of the present exemplary embodiment is described using a comparative example illustrated in FIG. 6 and FIG. 7. Structural portions that are the same as in the present exemplary embodiment are assigned the same reference numerals, and descriptions thereof are not given.

As shown in FIG. 7, a rear seat side airbag device 100 is attached to the cabin interior side wall portion 22A of the side garnish 22. This rear seat side airbag device 100 includes a case 102. An opening portion 102A that opens toward the cabin interior side wall portion 22A (the vehicle front) is formed in the case 102, and the rear seat side airbag device 100 is attached to the cabin interior side wall portion 22A. A side airbag 104 and the inflator 36 are accommodated inside the case 102. The side airbag 104 inflates and expands toward the vehicle front to the side of a vehicle occupant P at a time of a vehicle side collision. The inflator 36 supplies gas into the side airbag 104. At the time of vehicle collision, the inflating side airbag 104 opens the airbag door portion 22AB from inside the case 102 while rupturing a tear portion 106. Hence, the side airbag 104 inflates and expands between the vehicle occupant P sitting on the rear seat 12 (see FIG. 6) and the door trim 32.

However, the rear seat side airbag device 100 is disposed relatively close to the vehicle occupant in the vehicle front-and-rear direction. Consequently, when the side airbag 104 inflates and expands at the time of vehicle collision, the side airbag 104 inflates and expands such that the airbag distal end portion 34A thereof is disposed at the vehicle cabin front side with respect to a region S at the vehicle width direction outer side of the vehicle occupant P (see FIG. 6). As a result, a region W of the side airbag 104 at which the thickness thereof is greatest is disposed to the vehicle front side relative to the vehicle occupant P (i.e., the thickness of the side airbag 104 to the side of the vehicle occupant P is thinner). As a result, restraint performance for the vehicle occupant P may be diminished.

Figure 3:
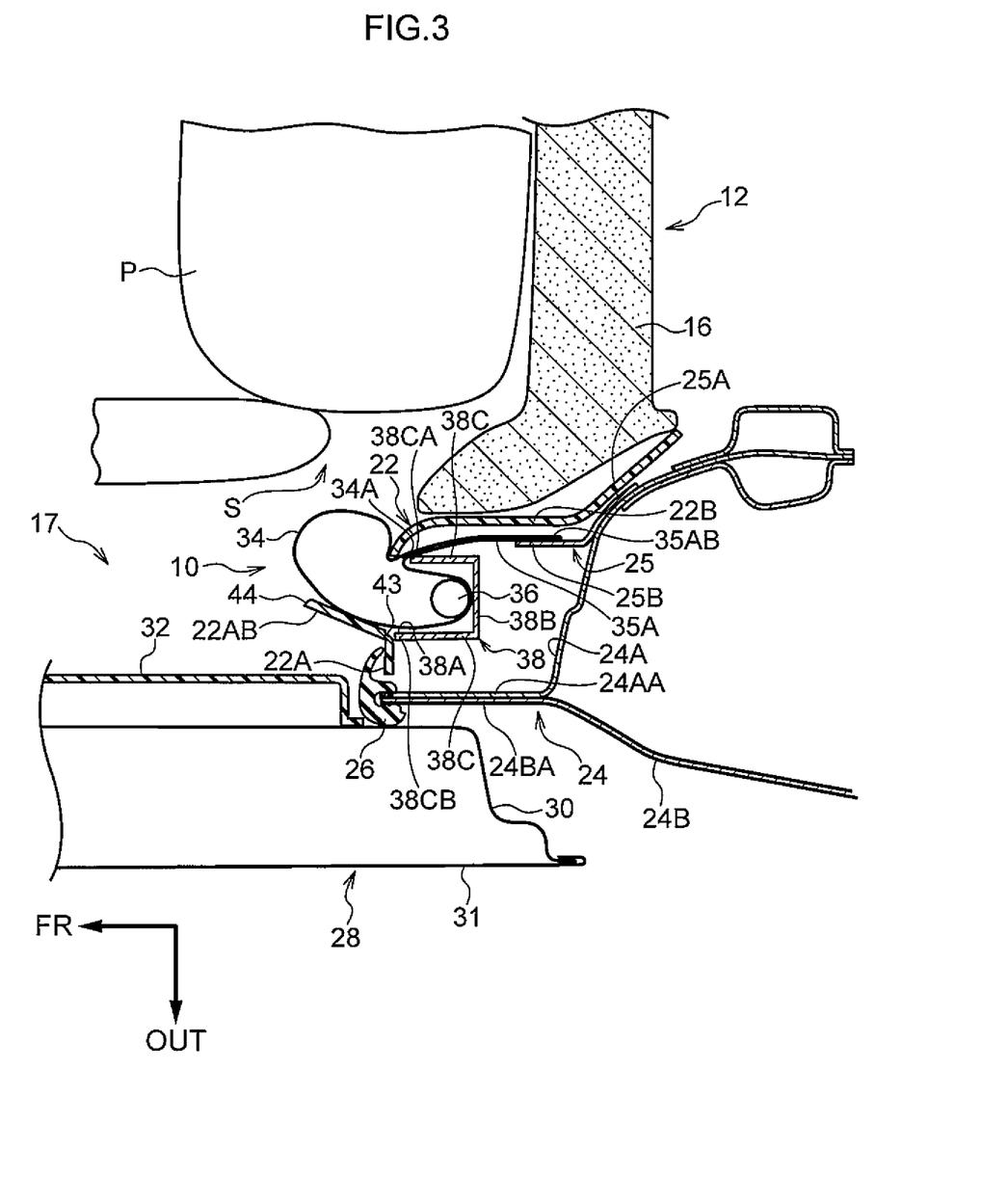
FIG. 3 is a schematic plan sectional diagram, corresponding to FIG. 2, showing a state at the start of activation of the rear seat side airbag device according to the present exemplary embodiment.
Figure 4:
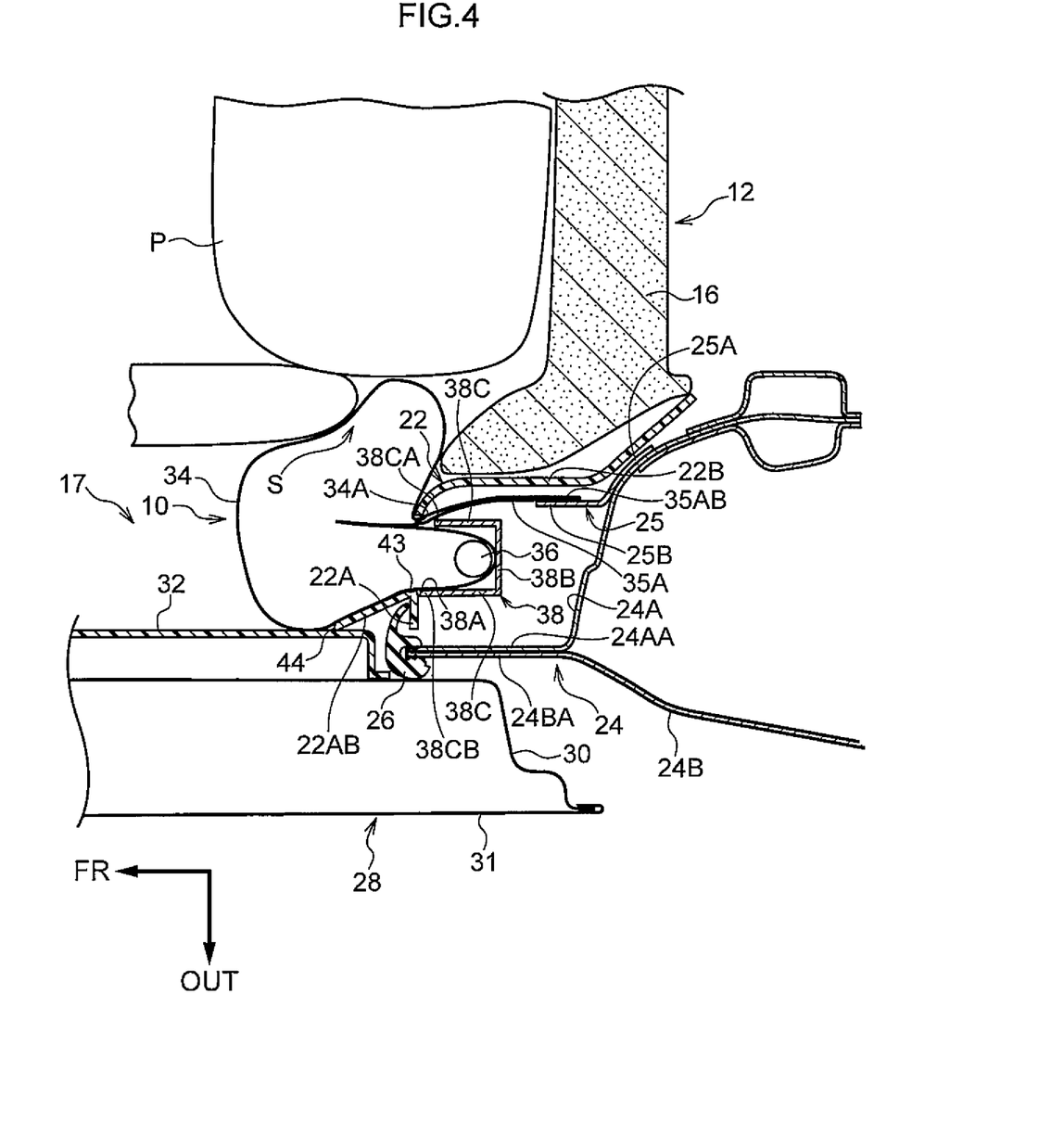
FIG. 4 is a schematic plan sectional diagram, corresponding to FIG. 2, showing a state in a later period of activation of the rear seat side airbag device according to the present exemplary embodiment.

In contrast, according to the present exemplary embodiment as shown in FIG. 2, the case 38 is provided inside the side garnish 22 that serves as the vehicle cabin side portion 17 corresponding with the rear seat 12, the case 38 includes the opening portion 38A that opens substantially toward the vehicle front side, and the inflator 36 and the side airbag 34 are accommodated in the case 38. The inflator 36 generates gas at a time of vehicle collision. Because the straps 35A and 35B of the side airbag 34 are fastened to the bracket 25 that is attached to the house inner 24A, the straps 35A and 35B are fixed at a region of the wheel house 24 that is at the vehicle width direction inner side and vehicle rear side with respect to the inflator 36. Therefore, when the side airbag 34 is supplied with gas from the inflator 36 at the time of vehicle collision, as shown in FIG. 3, the side airbag 34 inflates substantially toward the vehicle front side through the opening portion 38A of the case 38. However, because the straps 35A and 35B are fixed at the region of the wheel house 24 at the vehicle width direction inner side and vehicle rear side with respect to the inflator 36, as shown in FIG. 4, the gas flows toward the vehicle width direction inner side and the vehicle rear side, toward the airbag distal end portion 34A at which the straps 35A and 35B are attached. Consequently, the side airbag 34 inflates and expands in a folded-back state in a vehicle plan view (see FIG. 5). Therefore, because the thickness of the side airbag 34 is increased in a vicinity of the opening portion 38A of the case 38, the side airbag 34 that is folded back and has increased thickness may be disposed in a vicinity of the vehicle occupant P sitting on the rear seat 12. Hence, the vehicle occupant P may be restrained effectively during the vehicle collision. Thus, restraint performance for the vehicle occupant P may be improved.

Figure 5:
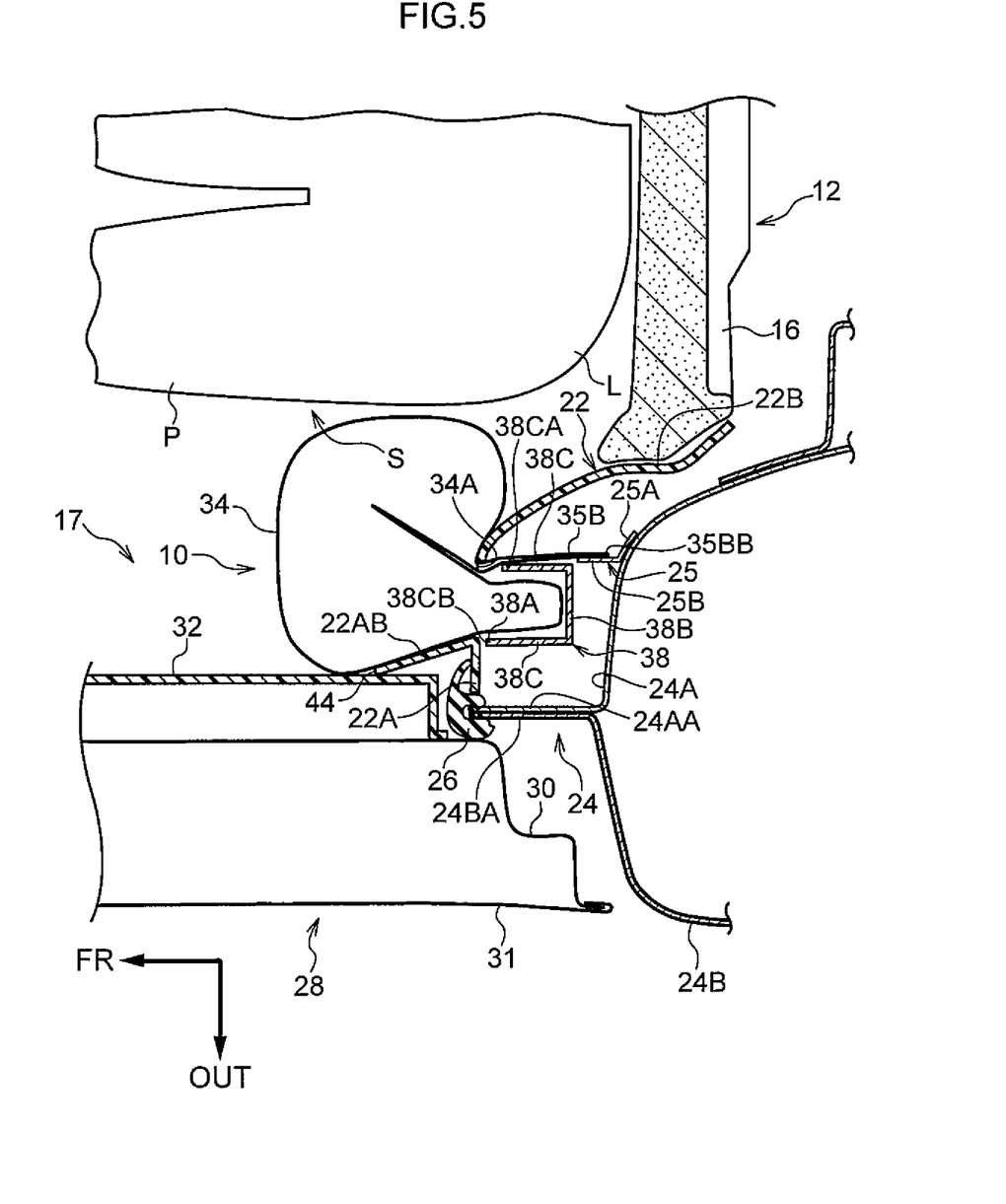
FIG. 5 is a magnified sectional diagram, cut along line B-B in FIG. 1, showing a state subsequent to activation of the rear seat side airbag device according to the present exemplary embodiment.

The second fastening hole 25D that is formed as a long hole whose length direction is in the substantial vehicle vertical direction is formed in the bracket 25 that serves as the vehicle body. The strap 35B is fixed to the wheel house 24 by the fastener that is inserted through the second fastening hole 25D and that is movable along the second fastening hole 25D. Therefore, the strap 35B and hence the airbag distal end portion 34A are movable in the substantial vehicle vertical direction. Accordingly, at times of non-activation of the side airbag 34, the straps 35A and 35B are disposed in the vicinity of the case 38 in the substantial vehicle vertical direction, and the side airbag 34 may be folded compactly. In the present exemplary embodiment as shown in FIG. 1, at times of non-activation of the side airbag 34, the strap 35B is fastened in the state (see the two-dot chain lines in FIG. 1) in which the strap 35B is close to the strap 35A that is fastened (rigidly fixed) to the first fastening hole 25C. Therefore, the side airbag 34 may be folded in a state in which a dimension thereof in the substantial vehicle vertical direction is small. On the other hand, at a time of activation of the side airbag 34, the strap 35B is moved in the substantial vehicle vertical direction by expansion pressure of the side airbag 34. Therefore, a range in which the side airbag 34 inflates and expands may be widened substantially to the vehicle lower side. Hence, as shown in FIG. 5, the pelvis area L of the vehicle occupant P may be restrained by the side airbag 34 whose thickness is increased by being folded back. Thus, restraint performance for the vehicle occupant P may be further improved.

Because the straps 35A and 35B are fixed to the bracket 25 that is attached to the wheel house 24, application of the present exemplary embodiment to alternative types of vehicle in which the wheel house 24 is different is enabled by modifying the shape of the bracket 25. In other words, commoditization of the rear seat side airbag device 10 may become simple.

The airbag distal end portion 34A includes the straps 35A and 35B that are separate bodies of which the one end portions 35AA and 35BA are fixed to the side airbag 34 and the another end portions 35AB and 35BB are fixed to the wheel house 24 via the bracket 25. Therefore, there is no need to provide a region at the side airbag 34 for fixing to the wheel house 24. Consequently, forming the shape of the side airbag 34 in a shape that is better for productivity is simple. Thus, costs may be lowered.

The present exemplary embodiment has a structure in which the rear seat side airbag device 10 is provided at the side garnish 22, but this is not limiting. Although not shown in the drawings, the rear seat side airbag device 10 may be provided at a side seat that is disposed at the vehicle width direction outer side with respect to the seat back 16 of the rear seat 12 and that serves as an interior decor member fixed to the vehicle body.

Although the straps 35A and 35B are fastened to the bracket 25 that is attached to the wheel house 24, this is not limiting. Structures are possible in which the straps 35A and 35B are directly attached to the wheel house 24, or the straps 35A and 35B may be attached to the vehicle body elsewhere than the wheel house 24. Further, structures are possible in which the straps 35A and 35B are attached to a region of the case 38 of the rear seat side airbag device 10 that is at the vehicle width direction inner side with respect to the inflator 36, and structures are possible in which the bracket 25 is attached to the case 38 and the straps 35A and 35B are attached to the bracket 25.

Although the straps 35A and 35B are provided at the airbag distal end portion 34A of the side airbag 34, this is not limiting. The airbag distal end portion 34A of the side airbag 34 may be fastened directly to the bracket 25, the wheel house 24 or the like without the straps 35A and 35B being provided.

The first fastening hole 25C of the bracket 25 at which the another end portion 35AB of the strap 35A is fastened is formed in a circular shape in vehicle side view, but this is not limiting. The first fastening hole 25C may be formed as a long hole in vehicle side view, similarly to the second fastening hole 25D.

The side airbag 34 is formed in a single-body bag shape, but this is not limiting. Structures are possible in which the side airbag 34 is provided with plural chambers that, by tethers being provided thereinside, vary in internal pressure in accordance with regions of restraint of the vehicle occupant P.

The present disclosure is not limited by the above recitations. In addition to the above recitations, it will be clear that numerous modifications may be embodied within a technical scope not departing from the gist of the disclosure.

What is claimed is:

1. A rear seat side airbag device comprising:
a case provided inside a vehicle cabin side portion in correspondence with a rear seat, the case being open substantially toward a vehicle front side;
an inflator accommodated inside the case, the inflator configured to generate gas at a time of vehicle collision; and
a side airbag accommodated inside the case and is configured to receive a supply of gas from the inflator and inflates and expands, the side air bag including a distal end portion being fixed to a region of the case or a vehicle body, which region is at a vehicle width direction inner side with respect to the inflator.

2. The rear seat side airbag device according to claim 1, wherein
a long hole is formed in the case or vehicle body, a length direction of the long hole being in a substantial vehicle vertical direction, and
the distal end portion is fixed to the vehicle body or case by a fastener that is inserted into the long hole, the fastener is movable along the long hole when an expansion pressure of the side airbag is applied.

3. The rear seat side airbag device according to claim 1, wherein the distal end portion is fixed to a bracket, the bracket attached to the vehicle body or case.

4. The rear seat side airbag device according to claim 1, wherein the distal end portion includes a strap that is a separate body, the strap including one end portion fixed to the side airbag and another end portion fixed to the vehicle body or case.

* * * * *